Patented Dec. 11, 1951

2,577,823

UNITED STATES PATENT OFFICE 2,577,823

HYDRODESULFURIZATION OF SULFUR-CONTAINING HYDROCARBON FRACTIONS

Harrison M. Stine, East Cleveland, Ohio, assignor to The Standard Oil Company, Cleveland, Ohio, a corporation of Ohio No Drawing. Application February 6, 1948, Serial No. 6,816

3 Claims. (Cl. 196—28)

This invention relates to the treatment of hydrocarbon fractions, containing organic sulfur compounds as impurities, by treatment with hydrogen in the presence of a particular alumina-chromia-molybdenum oxide catalyst. It also relates to particular catalysts for such processes.

Petroleum, or other hydrocarbon fractions which contain at least about 1%, up to about 6.5%, sulfur, in the form of organic sulfur compounds, are objectionable for use as fuel or as lubricating oils, solvents, or cracking stocks, and the like. The reduction of the sulfur content of high sulfur stocks to about 1% and lower sulfur stocks to less than 1% markedly improves such fractions.

In accordance with the invention, it is found that petroleum or other hydrocarbon fractions containing from about 1% to about 6.5% by weight of sulfur, in the form of organic sulfur compounds, may be treated with hydrogen in the presence of an alumina-chromia-molybdenum oxide catalyst prepared in a particular manner as described hereinafter, and the sulfur content will be advantageously reduced thereby. The invention is operative on such materials as cracking coil tar which are notoriously difficult to desulfurize. These heavy stocks are often used as industrial fuel oils and for such purposes a high sulfur content is objectionable.

The objects achieved in accordance with the invention include the provision of a method of hydrodesulfurizing hydrocarbon fractions containing from 1% to about 6.5% sulfur in the form of organic sulfur compounds; the provision of particular catalysts for such a process; and other objects which will be apparent as details and embodiments of the invention are set forth hereinafter.

The hydrocarbon fraction or stock may be treated in either the liquid phase or the gaseous phase, or mixtures thereof. Generally, at least some of the stock is in the liquid phase. In general, the stocks are of the heavier type, such as those with an A. P. I. gravity of 40 or lower, such as gas oils and heavier stocks. The ability to desulfurize these stocks, especially cracking coil tar, is noteworthy.

The treatment is at a temperature in the range of 650° F. to 850° F., preferably 725° F. to 800° F., and a pressure in the range of 100 to 500 pounds per square inch, gauge. Generally, the pressure will not be greater than that needed to get the desired result, and pressures of 300 or up to 350 and 400 give good results. The hydrogen circulation rate is 500 to 3,000 cubic feet of gas (standard conditions) per barrel of oil; preferably 1,000 to 2,500 cubic feet. There is not much advantage in a hydrogen circulation rate above 2,500 c. f./b. and in this respect the low hydrogen circulation rate is advantageous. The feed rate of the hydrocarbon stock to the catalyst may be in the range of 0.5 to 5 v. v. h., i. e., liquid volumes per volume of catalyst per hour.

The catalyst may be prepared by simultaneously precipitating the chromia and molybdenum oxide on a preformed alumina slurry (which is in the freshly precipitated state or dried and reslurried) at a pH of 6 to 8. The relative amounts of the oxides are such that the proportions thereof in the catalyst are in the ratio of from 50 to 85 mols (i. e., gram atomic weights) of Al, and the remainder molybdenum oxide and chromium oxide, each in amounts containing not less than 2 mols and not more than 30 mols of the material.

The aluminum oxide may be prepared by treating an aqueous solution of sodium aluminate with the stoichiometric amount of sulfuric acid, to precipitate hydrated aluminum oxide. This may be used as such or may be filtered, washed and heated at elevated temperatures. The molybdenum and chromium oxides may be precipitated in the presence of a slurry of the alumina at a pH of 6 to 8.

Ammonium paramolybdate or other molybdenum salt and chromium acetate, sulfate or nitrate may be used in the precipitation on the alumina by adjusting the hydrogen ion concentration so that the pH of the final mother liquor is in the range of 6 to 8, preferably about 7. After precipitation, the catalyst is washed and dried. Drying is preferably carried out at around 125° F. to 175° F. until in a hard granular condition, and then the material is ground and meshed to size. It is then given a final drying in which the temperature is gradually raised to about 900° F. to about 1,000° F. The catalyst may be cooled; and preferably is quenched or added hot to boiling water, and dried.

In place of ammonium paramolybdate, other soluble compounds of molybdenum may be used, including the reduced form known as molybdenum blue, and even lower valence forms.

Alternatively, aluminum and chromium oxides may be co-precipitated and the slurry may have molybdenum oxide precipitated thereon at a pH of 6 to 8, preferably 7. It is important that the molybdenum oxide be precipitated at this pH.

The above processes for making the catalyst are to be distinguished from the completely co-precipitated catalyst in which the oxides of all three metals are precipitated simultaneously, either by adding sodium aluminate to an acid solution of chromium and molybdenum compounds or by adding an alkaline material to a solution of the compounds of all three metals. The co-precipitation of all three metal oxides involves difficulties because at pH ranges optimum for precipitating aluminum oxide, the molybdenum will not be precipitated, and at pH ranges at which molybdenum oxide is insoluble, the aluminum tends to precipitate as a basic salt rather than the oxide.

The preferred catalyst is made as described in more detail hereinafter, by preparing an aluminum-chromium oxide gel by precipitation at optimum pH ranges, and the gel is washed and dried. The gel in the dried form is then impregnated with the ammonium paramolybdate in the desired solution.

In order to illustrate and point out some of the advantages of the invention, but not as a limitation thereof, the following illustrative examples are included.

CATALYST A

An aqueous solution of sodium aluminate is mixed with an aqueous solution of chromium nitrate, and sulfuric acid is added in proportions such that the precipitated oxides will contain Al and Cr in the proportions of 80 mols Al to 20 mols Cr. The amount of sulfuric acid used is such that the pH of the final mother liquor is 10.

A portion of the precipitated oxide is washed, dried at 150° F., granulated, and then dried at 900° F. It is then poured (hot) into boiled distilled water, and then oven-dried at 150° F. An aqueous solution of ammonium molybdate is mixed therewith, and then sulfuric acid is added. The amount of the acid is such that the pH of the final mother liquor is about 7. The proportions of the materials used are such that the final catalyst contains Cr, Mo and Al in the proportions 18 Cr:9 Mo:73 Al. The resulting catalyst is washed, dried, and finally heat treated as described above.

CATALYST B

A portion of the wet co-precipitate of chromium and aluminum oxide, prepared as described in the first paragraph under Catalyst A, is slurried in water, and an aqueous solution of ammonium paramolybdate is added thereto. Sulfuric acid is then added, in an amount so that the pH of the final mother liquor is 7. The relative amounts of materials are such that the final catalyst contains Cr, Mo and Al in the proportions 14 Cr:30 Mo:56 Al.

CATALYST C

A suspension of alumina in water is prepared in the conventional manner by adding 3.5 mols of sulfuric acid to 6 mols of sodium aluminate in 15 liters of water and then an aqueous solution of chromium nitrate (0.60 mol) is added. This is followed by adding an aqueous solution of ammonium molybdate (0.9 mol), and the pH of the final mother liquor is adjusted to 7 (by adding 1.03 mols of NH$_4$OH).

The above catalysts were used for the hydrodesulfurization of 250° F. reduced West Texas crude containing 2.3% by weight sulfur, in the form of organic sulfur compounds. The conditions and results are indicated in the following table:

Table I

| Catalyst | A | B | C |
|---|---|---|---|
| Temperature, in °F | 750 | 750 | 750 |
| Pressure, in lbs./sq. in. gauge | 300 | 300 | 300 |
| Hydrogen, in cu. ft. gas/bbl. of oil | 2,000 | 2,000 | 2,000 |
| Stock Feed Rate, in v. v. h | 1.0 | 1.0 | 1.0 |
| Per Cent Sulfur in Product: | | | |
| at 2 hours | 0.45 | 0.44 | 0.83 |
| at 5 hours | 0.79 | 0.72 | 0.72 |
| at 12 hours | 0.83 | 0.63 | 0.91 |

This data shows that the process of the invention readily reduces the sulfur content of the crude to a fraction of 1%.

The Catalyst C was also used in the hydrodesulfurization of a cracking coil tar containing 2.0% S, in the form of organic sulfur compounds. This material is particularly difficult to process. The conditions and results are as follows.

Table II

| | |
|---|---|
| Temperature in °F | 750 |
| Pressure in lbs./sq. in. gauge | 300 |
| Hydrogen in cu. ft. gas/bbl. of oil | 1000 |
| Stock feed rate in v. v. h | 1.0 |
| Per cent sulfur in product at 2 hours | 0.93 |

These data show that the catalyst is particularly effective for reducing the sulfur content in hard-to-process materials.

Following comparable procedures using hydrocarbon stock, such as gas oils and heavier stock having an API gravity of 40 or lower, and comparable catalysts, pressure, temperature, flow rate and hydrogen feed rate conditions, as discussed hereinbefore, comparable results are obtained.

In order to illustrate the superiority of catalysts prepared by a process in which the pH of the final mother liquor is about 7, the following illustrative examples are included.

CATALYST D

A slurry of wet alumina gel is prepared by treating an aqueous solution of sodium aluminate with a stoichiometric amount of sulfuric acid, followed by filtering and washing, and then redispersing in water. This is mixed with aqueous ammonium molybdate and chromium nitrate, and the pH of the final mother liquor is adjusted to 7. The amounts of the materials are such as to provide a theoretical composition in the final catalyst in molal proportions 8 Cr : 12 Mo : 80 Al.

CATALYST E

This is prepared similarly to Catalyst D, except that the pH of the final mother liquor is 5.5.

CATALYST F

This is prepared similarly to Catalyst D, except that the pH of the final mother liquor is 8.5.

In order that the effect on pH control on the molybdenum content may be appreciable, the following table is included:

| | Per Cent Cr (by weight) | Per Cent Mo (by weight) |
|---|---|---|
| Catalyst D | 4.6 | 15.4 |
| Catalyst E | 3.8 | 8.8 |
| Catalyst F | 3.4 | 5.6 |

These catalysts were used in the desulfurization of a paraffin distillate containing 1.1% by weight of sulfur in the form of organic sulfur compounds; at 750° F. and 300 pounds per square inch gauge pressure, circulating 1,000 cubic feet of hydrogen gas per barrel of oil. The feed rate of hydrocarbon relative to the catalyst is 1.0 v. v. h.

*Table III*

| Catalyst | D | E | F |
|---|---|---|---|
| Per Cent Sulfur in Product after catalyst is in use 150 hours | 0.30 | 0.50 | 0.86 |

These data clearly demonstrate the unexpected superiority of the Catalyst D, obtained by the process in which the pH of the final mother liquor is about 7. By plotting these values with others and interpolating it is found that reasonably good results are obtained when the pH value is 6 to 8.

In view of the foregoing disclosure, variations and modifications of the invention will be apparent to those skilled in the art. The invention contemplates all such variations and modifications, except as do not come within the scope of the appended claims.

I claim:

1. A process of desulfurizing heavy hydrocarbon oil fractions containing between 1.0 to 6.5% by weight sulfur in the form of organic sulfur compounds, which comprises subjecting said oil in the presence of added hydrogen in partial pressure of 100 to 500 pounds per square inch gauge at a temperature in the range of 650 to 850° F., to the action of a contact mass consisting of chromium, molybdenum and aluminum oxides in proportions to provide 50 to 85 mol per cent of aluminum oxide and the remainder molybdenum oxide and chromium oxide, each in an amount of not less than 2 mol per cent and not more than 30 mol per cent, and in which the molybdenum oxide is precipitated on preformed aluminum oxide at a pH of 6 to 8.

2. A process of desulfurizing hydrocarbon oil fractions comprising gas oils and heavier hydrocarbons and containing between 1.0 to 6.5% by weight sulfur in the form of organic sulfur compounds, which comprises subjecting said oil in the presence of added hydrogen in partial pressure of 100 to 500 pounds per square inch gauge at a temperature in the range of 650 to 850° F., to the action of a contact mass consisting of chromium, molybdenum and aluminum oxides in proportions to provide 50 to 85 mol per cent of aluminum oxide, and the remainder molybdenum oxide and chromium oxide, each in an amount of not less than 2 mol per cent and not more than 30 mol per cent, said catalyst containing the molybdenum oxide and chromia as oxides co-precipitated on preformed aluminum oxide at a pH of 6 to 8.

3. The process of claim 2 in which said molybdenum oxide and chromium oxide are co-precipitated on a wet aluminum oxide slurry before said slurry is dried after preparation.

HARRISON M. STINE.

REFERENCES CITED

The following references are of record in the file of this patent:

UNITED STATES PATENTS

| Number | Name | Date |
|---|---|---|
| 1,884,269 | Russell | Oct. 25, 1932 |
| 2,273,338 | Thomas | Feb. 17, 1942 |
| 2,323,868 | Hughes | July 6, 1943 |
| 2,334,159 | Friedman | Nov. 9, 1943 |
| 2,377,113 | Thomas | May 29, 1945 |
| 2,391,358 | Spicer et al. | Dec. 18, 1945 |
| 2,393,238 | Byrns | Jan. 22, 1946 |
| 2,412,600 | Burk et al. | Dec. 17, 1946 |
| 2,432,286 | Claussen et al. | Dec. 9, 1947 |